(12) United States Patent
Hayasaka et al.

(10) Patent No.: US 8,131,079 B2
(45) Date of Patent: Mar. 6, 2012

(54) PEDESTRIAN DETECTION DEVICE AND PEDESTRIAN DETECTION METHOD

(75) Inventors: Shoichi Hayasaka, Susono (JP); Hideo Fukamachi, Hadano (JP); Yoshimasa Hara, Nagoya (JP); Toshio Sawaki, Kausgai (JP); Hironori Sato, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 438 days.

(21) Appl. No.: 12/308,553

(22) PCT Filed: Nov. 9, 2007

(86) PCT No.: PCT/IB2007/004221
§ 371 (c)(1),
(2), (4) Date: Dec. 18, 2008

(87) PCT Pub. No.: WO2008/056261
PCT Pub. Date: May 15, 2008

(65) Prior Publication Data
US 2010/0067740 A1    Mar. 18, 2010

(30) Foreign Application Priority Data
Nov. 9, 2006  (JP) .................................. 2006-304326

(51) Int. Cl.
*G06K 9/00* (2006.01)
(52) U.S. Cl. ........................................ 382/181; 701/200
(58) Field of Classification Search .................. 382/100, 382/103, 106, 107, 115, 117, 118, 181, 190, 382/195, 199, 203, 206, 217, 218, 219; 701/1, 701/200, 300, 301, 302; 351/204
See application file for complete search history.

(56) References Cited

U.S. PATENT DOCUMENTS

| | | | | |
|---|---|---|---|---|
| 5,432,864 A * | 7/1995 | Lu et al. | | 382/118 |
| 6,035,053 A * | 3/2000 | Yoshioka et al. | | 382/104 |
| 6,956,469 B2 * | 10/2005 | Hirvonen et al. | | 340/435 |
| 7,397,931 B2 * | 7/2008 | Imagawa et al. | | 382/103 |
| 7,418,112 B2 * | 8/2008 | Ogasawara | | 382/103 |
| 7,684,590 B2 * | 3/2010 | Kämpchen et al. | | 382/103 |
| 7,957,559 B2 * | 6/2011 | Shima et al. | | 382/104 |
| 8,005,266 B2 * | 8/2011 | Saka et al. | | 382/104 |
| 2005/0111698 A1 | 5/2005 | Kawai | | |
| 2007/0047767 A1 | 3/2007 | Watabe | | |

FOREIGN PATENT DOCUMENTS

| | | |
|---|---|---|
| EP | 1 760 632 A2 | 3/2007 |
| JP | A-2005-352974 | 12/2005 |
| WO | WO 2005/002921 A2 | 1/2005 |

* cited by examiner

*Primary Examiner* — Anand Bhatnagar
(74) *Attorney, Agent, or Firm* — Oliff & Berridge, PLC

(57) ABSTRACT

A near-infrared night vision device to which a pedestrian detection device is applied includes a near-infrared projector, a near-infrared camera, a display and an ECU. By executing programs, the ECU constitutes a pedestrian candidate extraction portion and a determination portion. The pedestrian candidate extraction portion extracts pedestrian candidate regions from near-infrared images. The determination portion normalizes the sizes and the brightnesses of the pedestrian candidates extracted by the pedestrian candidate extraction portion, and then computes the degrees of similarity between the normalized pedestrian candidates. The determination portion determines that a pedestrian candidate having two or more other pedestrian candidates whose degree of similarity with the pedestrian candidate is greater than or equal to a predetermined value is not a pedestrian.

6 Claims, 9 Drawing Sheets

FIG. 7

| | PEDESTRIAN CANDIDATE① | PEDESTRIAN CANDIDATE② | PEDESTRIAN CANDIDATE③ | PEDESTRIAN CANDIDATE④ |
|---|---|---|---|---|
| PEDESTRIAN CANDIDATE① | - | 300 | 343 | 679 |
| PEDESTRIAN CANDIDATE② | 300 | - | 523 | 423 |
| PEDESTRIAN CANDIDATE③ | 343 | 523 | - | 589 |
| PEDESTRIAN CANDIDATE④ | 679 | 423 | 589 | - |

FIG. 8

| | ① | ② | ③ | ④ | NUMBER OF CANDIDATES | DETERMINATION |
|---|---|---|---|---|---|---|
| ① | – | 300 | 343 | 679 | 3 | ARTIFACT |
| ② | 300 | – | 523 | 423 | 3 | ARTIFACT |
| ③ | 343 | 523 | – | 589 | 3 | ARTIFACT |
| ④ | 679 | 423 | 589 | – | 3 | ARTIFACT |

PEDESTRIAN DETECTION DEVICE AND PEDESTRIAN DETECTION METHOD

BACKGROUND OF THE INVENTION

1. Field of the Invention

The invention relates to a pedestrian detection device and a pedestrian detection method.

2. Description of the Related Art

In recent years, vehicular night vision devices which pick up and display near-infrared images of an area forward of a vehicle, and detect pedestrians from the picked-up images, and present results of the detection superimposed on the near-infrared images have been put into practical use. As a pedestrian detection technology for use in such a night vision device, Japanese Patent Application Publication No. 2005-352974 (JP-A-2005-352974) describes a technology that searches for whether or not a site in a detection object that is the same in shape as a predetermined site in the detection object continuously exists. If the site being the same in shape as the predetermined site continuously exists in the detection object, the technology determines that the object is an artifact, and excludes the object, and proceeds to recognize a pedestrian from the remaining detection objects.

On the other hand, in a real road environment, there relatively frequently occurs a situation in which a plurality of artifacts, for example, guardrail posts, utility poles, etc., exist side by side. In the case where such a plurality of artifacts are extracted as detection objects, that is, candidates for pedestrians, it is necessary in the foregoing technology to search on each of the pedestrian candidates for whether or not a site being the same in shape as a predetermined site continuously exists. To determine whether or not a pedestrian candidate is a pedestrian with respect to all the pedestrian candidates, the technology inevitably requires a long processing time, which is a problem. Therefore, a faster process of determining whether or not a pedestrian candidate is a pedestrian (a faster pedestrian detection process) is desired particularly in systems that require a real-time characteristic of the process, such as a system used in a vehicle that runs at high speed.

SUMMARY OF THE INVENTION

The invention provides a pedestrian detection device capable of quickly executing a process of determining whether or not a pedestrian candidate is a pedestrian with respect to each pedestrian candidate in the case where a plurality of pedestrian candidates are extracted.

A pedestrian detection device in accordance with an aspect of the invention includes: pedestrian candidate extraction means for extracting a pedestrian candidate from a picked-up image; and determination means for finding a degree of similarity between pedestrian candidates if a plurality of pedestrian candidates are extracted by the pedestrian candidate extraction means, and for determining that a pedestrian candidate whose degree of similarity with another pedestrian candidate is greater than or equal to a predetermined value is not a pedestrian.

For example, artifacts, such as guardrail posts, utility poles, etc., have substantially the same shape, with respect to each kind of artifact. On the other hand, pedestrians are different in dress, posture, etc., depending on individuals, and there is hardly any possibility that pedestrians in the same dress and posture are simultaneously picked up as images. Utilizing such characteristics, the pedestrian detection device in accordance with the aspect of the invention finds the degree of similarity between the pedestrian candidates if a plurality of pedestrian candidates are extracted by the pedestrian candidate extraction means, and then the pedestrian detection device determines that a pedestrian candidate whose degree of similarity with another pedestrian candidate is greater than or equal to the predetermined value is not a pedestrian but an artifact. Therefore, according to the pedestrian detection device in accordance with the aspect of the invention, pedestrian candidates similar to each other can be simultaneously rejected as not being pedestrians merely by making a determination regarding the degree of similarity between the pedestrian candidates. As a result, even in the case where a plurality of pedestrian candidates are extracted, it is possible to quickly execute the process of determining whether or not a pedestrian candidate is a pedestrian, with respect to all the pedestrian candidates.

In the pedestrian detection device in accordance with the aspect of the invention, the determination means may determine that the pedestrian candidate having two or more other pedestrian candidates whose degrees of similarity with the pedestrian candidate are greater than or equal to the predetermined value is not a pedestrian.

In this case, in order to determine that a pedestrian candidate is not a pedestrian, it is necessary that there be at least two similar pedestrian candidates. Therefore, it becomes possible to further accurately determine whether or not a pedestrian candidate is a pedestrian.

In the pedestrian detection device in accordance with the aspect of the invention, the pedestrian candidate extraction means may normalize a size and/or a brightness of the pedestrian candidate extracted, and the determination means may find the degree of similarity between pedestrian candidates normalized in the size and/or the brightness by the pedestrian candidate extraction means.

Pedestrian candidates extracted from picked-up images vary in size and brightness depending on the distance from the image pickup means, the conditions of irradiation by the vehicle's lights or the like. According to the pedestrian detection device in accordance with the aspect of the invention, since the sizes and the brightnesses of the pedestrian candidates extracted are normalized before the degrees of similarity between the pedestrian candidates are found, it is possible to improve the accuracy of the computation of the degrees of similarity.

A pedestrian detection method in accordance with a second aspect of the invention includes:

extracting a pedestrian candidate from a picked-up image; and finding a degree of similarity between pedestrian candidates, and determining that a pedestrian candidate whose degree of similarity with another pedestrian candidate is greater than or equal to a predetermined value is not a pedestrian, when a plurality of pedestrian candidates are extracted by extraction of the pedestrian candidate extraction.

According to the pedestrian detection method in accordance with the second aspect of the invention, pedestrian candidates similar to each other can be simultaneously rejected as not being pedestrians merely by making a determination regarding the degree of similarity between the pedestrian candidates. As a result, even in the case where a plurality of pedestrian candidates are extracted, it is possible to quickly execute the process of determining whether or not a pedestrian candidate is a pedestrian with respect to all the pedestrian candidates.

According to the invention, since it is determined that a pedestrian candidate whose degree of similarity with another pedestrian candidate is not a pedestrian, it is possible to quickly execute the process of determining whether or not a pedestrian candidate is a pedestrian with respect to each pedestrian candidate in the case where a plurality of pedestrian candidates are extracted.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 7 is a table showing an example of the degrees of similarity between the post-normalization pedestrian candidates shown in FIG. 5;

FIG. 8 is a table showing an example of results of determination as to whether or not a candidate is a pedestrian.

DETAILED DESCRIPTION OF THE EMBODIMENTS

Figure 1:
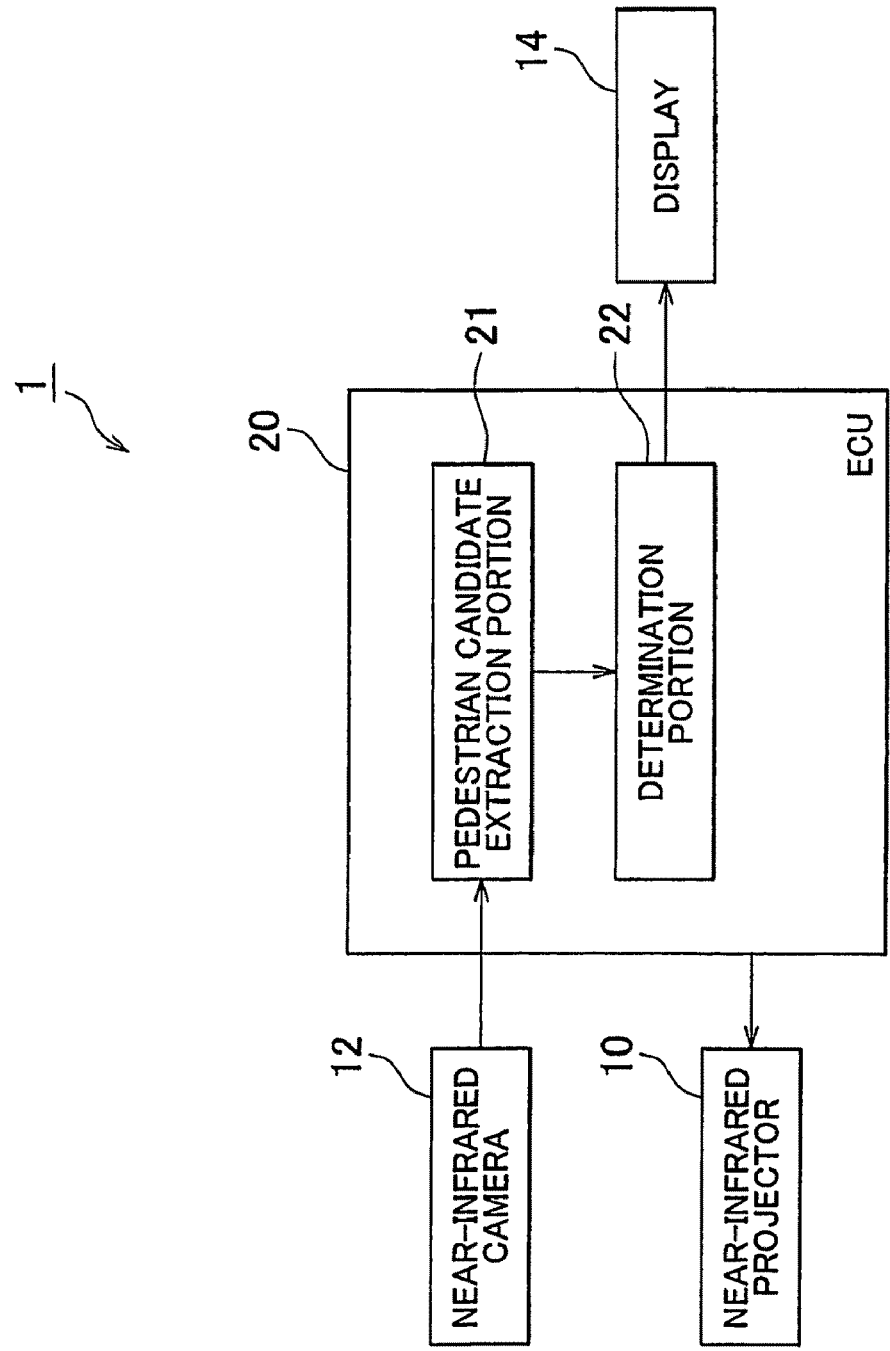
FIG. 1 is a diagram showing a construction of a near-infrared night vision device to which a pedestrian detection device in accordance with an embodiment is applied.
Figure 2:
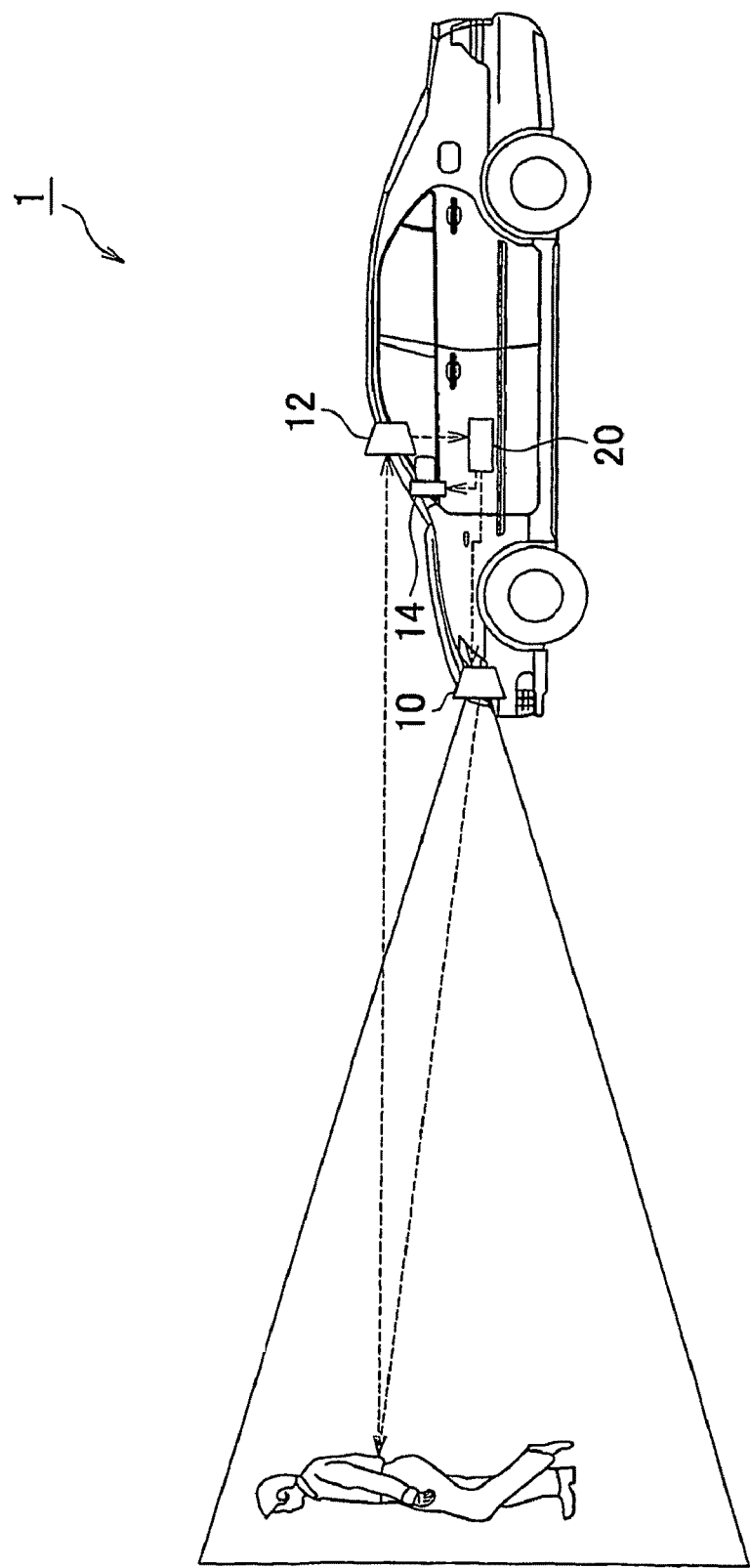
FIG. 2 is a diagram showing an arrangement of various appliances of the near-infrared night vision device to which the pedestrian detection device in accordance with the embodiment is applied.

Preferred embodiments of the invention will be described below with reference to the drawings. In the drawings, the same reference characters are used for the same or corresponding portions. Firstly, with reference to FIGS. 1 and 2, a construction of a pedestrian detection device in accordance with an embodiment of the invention will be described. In addition, the following description will be made in conjunction with an example in which a pedestrian detection device in accordance with the invention is applied to a near-infrared night vision device 1. FIG. 1 is a diagram showing a construction of the near-infrared night vision device 1 to which the pedestrian detection device is applied. FIG. 2 is a diagram showing an arrangement of various appliances of the near-infrared night vision device 1.

The near-infrared night vision device 1 is a device that displays near-infrared images of an area forward of a vehicle picked up by a near-infrared camera, and detects a pedestrian or pedestrians from the picked-up images, and displays results of the detection (pedestrian information) superimposed on the near-infrared images, in order to assist a driver during night driving. The near-infrared night vision device 1 includes a near-infrared projector 10, a near-infrared camera 12, a display 14, and an electronic control device (hereinafter, referred to as "ECU") 20.

The near-infrared projector 10 is disposed on a front end of the vehicle, and is mounted so as to be directed forward relative to the vehicle. The near-infrared projector 10 casts near-infrared radiation in a forward direction from the vehicle. The irradiation range of the near-infrared radiation from the near-infrared projector 10 is set, for example, so as to be several tens of meters ahead of the irradiation range of the low beams of the head light. The near-infrared projector 10 is turned on when the near-infrared night vision device 1 is activated, and the near-infrared projector 10 is turned off when the near-infrared night vision device 1 stops.

The near-infrared camera 12 is disposed in a forward side of the vehicle (e.g., on the reverse side of the rear view mirror), and is mounted so as to be directed forward relative to the vehicle. The near-infrared camera 12 takes in near-infrared radiation (reflections of the near-infrared radiation from near-infrared projector 10, and the like), and generates a near-infrared video picture of lights and shades corresponding to intensities of the near-infrared radiation. The near-infrared video picture is made up of frames of near-infrared images produced at every fixed time (e.g., 1/30 second). The near-infrared camera 12 sends the near-infrared image information of a frame as an image signal to the ECU 20 at every fixed time.

The display 14 presents to a driving person near-infrared images and information regarding pedestrians detected from near-infrared images. For example, a liquid crystal display or a head-up display, etc., may be used. The display 14 receives display signals from the ECU 20, and displays images represented by the display signals. Examples of the display images of pedestrian information include an image in which a pedestrian detected in a picked-up near-infrared image is emphasized by a surrounding rectangular frame.

The ECU 20 is made up of a CPU (Central Processing Unit), a ROM (Read Only Memory), a RAM (Random Access Memory), etc. By executing programs stored in the ROM, the ECU 20 constitutes a pedestrian candidate extraction portion 21 and a determination portion 22. The ECU 20 receives an image signal from the near-infrared camera 12 at every fixed time so as to detect pedestrians from near-infrared images. Then, the ECU 20 displays results of the pedestrian detection on the display 14. Incidentally, in this embodiment, the pedestrian candidate extraction portion 21 may be regarded as pedestrian candidate extraction means in the invention, and the determination portion 22 may be regarded as determination means in the invention.

Figure 3:
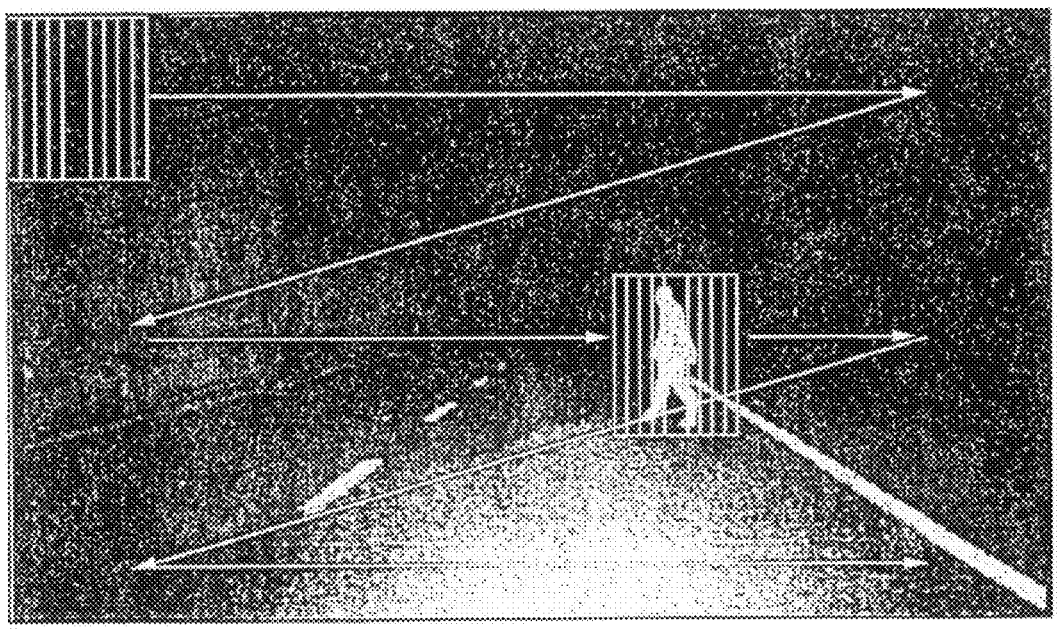
FIG. 3 is a diagram for describing an extraction method for a pedestrian candidate.

The pedestrian candidate extraction portion 21 extracts a pedestrian candidate region from near-infrared images. The method for this extraction is not particularly limited, but various methods may be applied. Examples of the extraction method include a method in which a template of a pedestrian is prepared, and is used for pattern matching. Concretely, as shown in FIG. 3, rectangular regions of a predetermined size are sequentially cut out of a near-infrared image, and the degree of matching of each cut-out rectangular region image with the image of the template is found. If the degree of matching is greater than or equal to a threshold value, the rectangular region is determined as a pedestrian candidate region. The thus-extracted pedestrian candidate region (hereinafter, referred to as "pedestrian candidate") is output to the determination portion 22.

Figure 4:
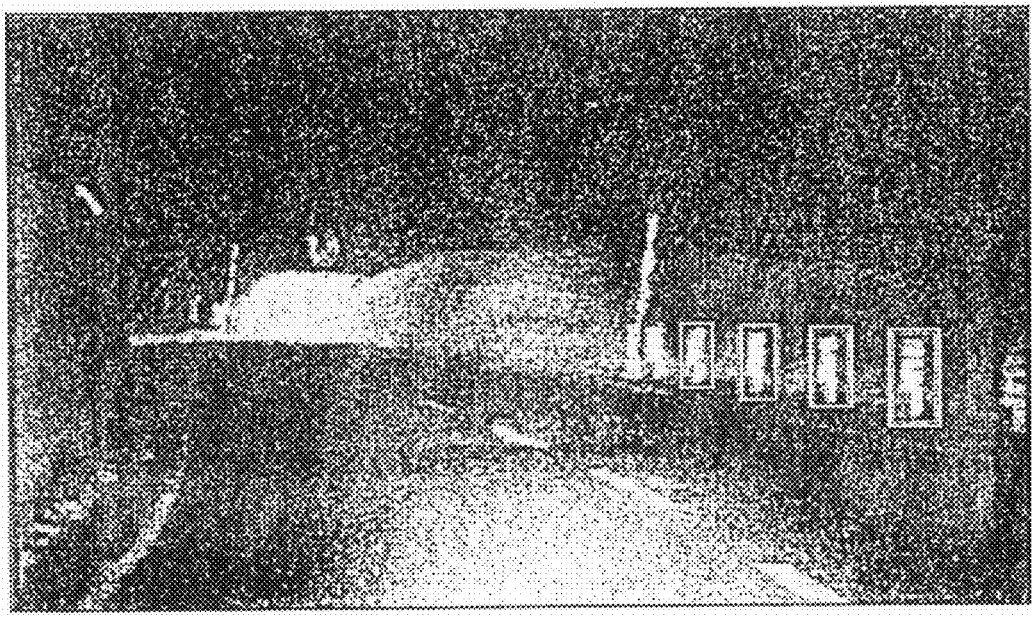
FIG. 4 is a diagram showing an example in which guardrail posts are mistaken for pedestrian candidates and are thus extracted.

It is to be noted herein that in the pattern matching through the use of a template of a pedestrian, there is a possibility of mistakenly extracting as a pedestrian candidate a guardrail post, a utility pole, etc., that is provided on or along a road as well as extracting a pedestrian. An example in which a guardrail post is mistakenly extracted as a pedestrian candidate is shown in FIG. 4.

The determination portion 22 normalizes the sizes and the brightnesses of the pedestrian candidates extracted by the pedestrian candidate extraction portion 21, and then computes the degrees of similarity between the normalized pedestrian candidates, and distinguishes whether a candidate is a pedestrian or an artifact on the basis of the degrees of similarity. In this manner, the determination portion 22 detects a pedestrian or pedestrians.

Figure 5:
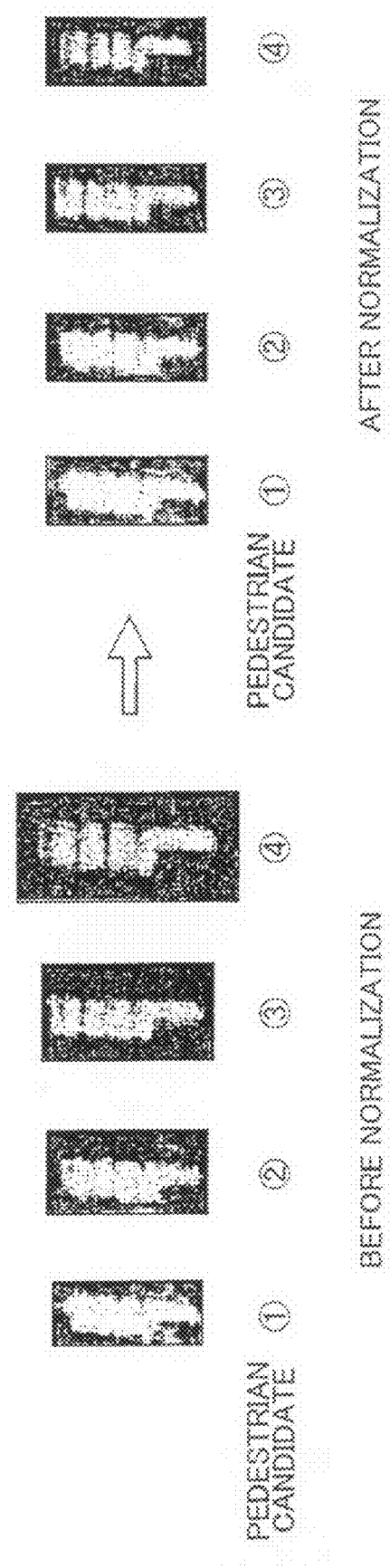
FIG. 5 is a diagram showing images before and after the normalization of the size and brightness of the pedestrian candidates (guardrail posts) shown in FIG. 4.

The normalization of the size and the brightness of a pedestrian candidate will be described below. The greater the distance between the near-infrared camera 12 and a pedestrian candidate, the smaller the size of the pedestrian candidate in the image picked up by the near-infrared camera 12, and the lower the brightness thereof. Therefore, the sizes and the brightnesses of pedestrian candidates are normalized by adjusting the variations in the size and the brightness of the pedestrian candidates, so that the accuracy of the computation of the degrees of similarity performed in a later process will be heightened. The normalization of the sizes can be performed in accordance with the distances between the near-infrared camera 12 and the pedestrian candidates. Besides, the normalization of the brightness is performed, for example, by expanding the distribution of brightness to the zero-to-maximum span (0-255) that can be expressed by the near-infrared camera 12, or by dividing the distribution of brightness by the variance so that a normal distribution is obtained. Herein, images before and after the sizes and the brightnesses of the pedestrian candidates (guardrail posts) mistakenly extracted in FIG. 4 are normalized are shown in FIG. 5.

Subsequently, a method of distinguishing whether a pedestrian candidate is a pedestrian or an artifact on the basis of the degrees of similarity between pedestrian candidates will be described. For example, artifacts, such as guardrail posts, utility poles, etc., have substantially the same shape, with respect to each kind of artifact. On the other hand, pedestrians are different in dress, posture, etc., depending on individuals, and there is hardly any possibility that pedestrians in the same dress and posture are simultaneously picked up as images. Utilizing such characteristics, the determination portion 22 acquires the degrees of similarity between the post-normalization pedestrian candidates by computing the Euclidean distances (square roots of the sums of the squares of the brightness differences) between the pedestrian candidates on the basis of the brightness differences in terms of individual pixels. If there are two or more similar pedestrian candidates, the determination portion 22 determines that the pedestrian candidates are not pedestrians, in other words, are artifacts. Results of the determination are sent as display signals to the display 14.

Figure 6:
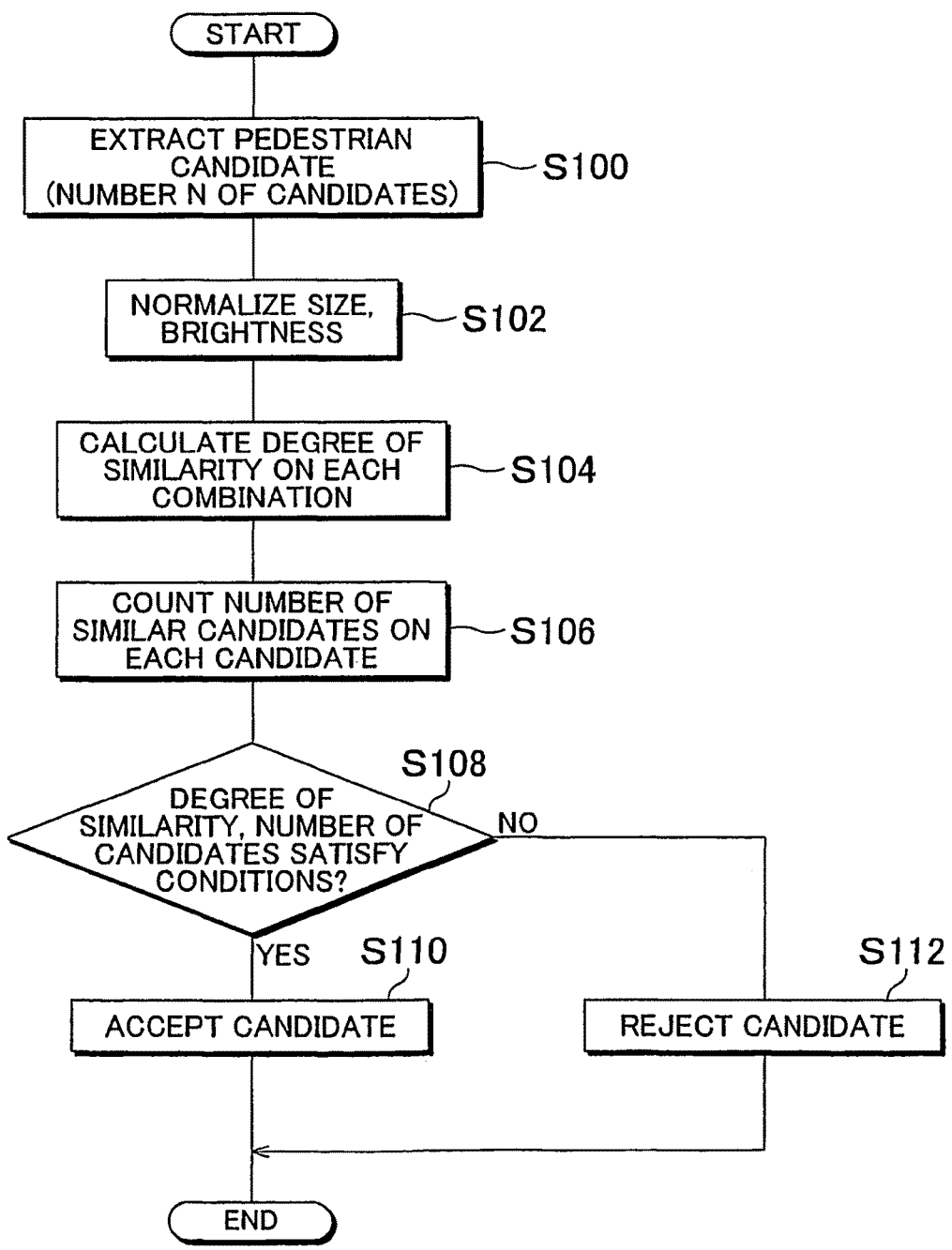
FIG. 6 is a flowchart showing a processing procedure of a pedestrian detection process performed by the pedestrian detection device in accordance with the embodiment.

Next, with reference to FIG. 6, operations of the pedestrian detection device applied to the near-infrared night vision device 1 will be described. FIG. 6 is a flowchart showing a processing procedure of a pedestrian detection process performed by the pedestrian detection device. The pedestrian detection, performed by the ECU 20, is executed repeatedly at a predetermined timing during the period from the turning-on to the turning-off of the electric power source of the near-infrared night vision device 1.

When the near-infrared night vision device 1 is activated, the near-infrared projector 10 casts near-infrared radiation in the forward direction from the vehicle. The near-infrared camera 12 picks up an image of an area forward of the vehicle by near-infrared radiation, and sends to the ECU 20 an image signal that contains the picked-up image information of a frame at every fixed time. The ECU 20, at every fixed time, receives the image signal from the near-infrared camera 12, and acquires the picked-up image.

Then, in step S100, pedestrian candidates are extracted from the picked-up image by the pattern matching through the use of the template. Subsequently in step S102, the size and the brightness of each pedestrian candidate is normalized. Incidentally, the extraction method for pedestrian candidates and the method of normalization are exactly as described above, and the description thereof will be omitted herein.

Subsequently in step S104, with regard to all the combinations of the normalized pedestrian candidates, the Euclidean distance (the square root of the sum of the squares of brightness differences) is computed on the basis of the brightness differences in terms of individual pixels. In this manner, the degrees of similarity between the pedestrian candidates are found. In this case, the smaller the Euclidean distance between pedestrian candidates, the greater the degree of similarity is determined to be. An example of results of the computation of the degrees of similarity between the normalized pedestrian candidates shown in FIG. 5 is shown in FIG. 7. Incidentally, each of the numerical values shown in the table of FIG. 7 is a Euclidean distance, that is, the square root of the sum of the squares of the brightness differences between pedestrian candidates. In the example shown in FIG. 7, the pedestrian candidates 1 to 4 are guardrail posts mistakenly extracted as pedestrian candidates, and therefore closely resemble each other in shape and brightness; in consequence, the degrees of similarity between pedestrian candidates are high, and the Euclidean distances are relatively small in value.

Next, in step S106, with respect to each pedestrian candidate, the number of other pedestrian candidates whose Euclidean distance is less than a predetermined value of 800, that is, whose degree of similarity is relatively high, is counted. Results of the counting in the forgoing example shown in FIG. 7 are shown in FIG. 8. As shown in FIG. 8, as for the pedestrian candidate 1, the Euclidean distance with the pedestrian candidate 2 is 300, and the Euclidean distance with the pedestrian candidate 3 is 343, and the Euclidean distance with the pedestrian candidate 4 is 679; thus, the number of pedestrian candidates whose Euclidean distance is less than 800 (hereinafter, referred to as "the number of similar candidates") is counted as 3. Likewise, as for the pedestrian candidates 2 to 4, too, the number of similar candidates is counted as 3.

Subsequently in step S108, it is determined with respect to each pedestrian candidate whether or not the degree of similarity is high, that is, whether or not the number of other pedestrian candidates whose Euclidean distance is less than 800 is more than 1 (2 or more). If the number of similar candidates is less than or equal to 1 (less than 2), it is determined in step S110 that the pedestrian candidate is a pedestrian. After that, this process is exited on a temporary basis. On the other hand, if the number of similar candidates is more than 1, it is determined in step S112 that the pedestrian candidate is not a pedestrian but an artifact, and the pedestrian candidate is rejected. After that, the process is exited on a temporary basis.

Incidentally, since with regard to every one of the foregoing pedestrian candidates 1 to 4, the number of similar candidates is 3, which is greater than 1, every one of them is determined not to be a pedestrian but to be an artifact, as shown in the right-end column of the table in FIG. 8. In the case where the pedestrian candidate 4 were not a result of extraction of a guardrail post but a pedestrian and its Euclidean distances with the other pedestrian candidates 1 to 3 are each greater than or equal to 800, the number of similar candidates would be less than or equal to 1, and the pedestrian candidate 4 would be determined to be a pedestrian.

Figure 9:
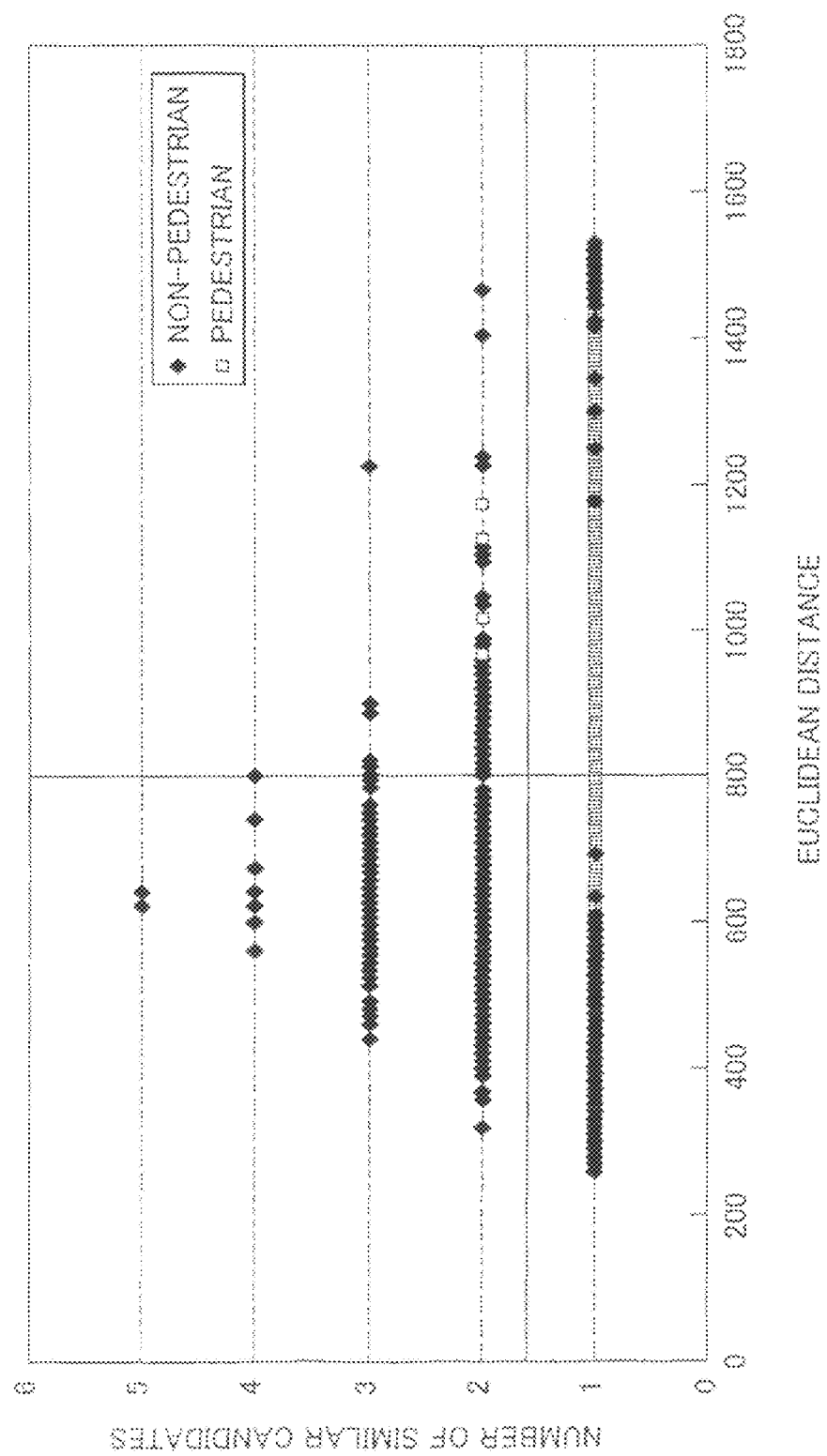
FIG. 9 is a diagram for describing a method of setting pedestrian determination threshold values.

With reference to FIG. 9, a setting method for the pedestrian determination threshold values (the degree of similarity and the number of similar candidates) for determining whether or not a pedestrian candidate is a pedestrian or a non-pedestrian (artifact) will be described. FIG. 9 is a diagram for describing the setting method for the pedestrian determination threshold values. In FIG. 9, the horizontal axis represents the degree of similarity (Euclidean distance), and the vertical axis represents the number of similar candidates. The pedestrian determination threshold values are set as follows. That is, a diagram of the degree of similarity-number of similar candidates dispersion (FIG. 9) is created from a plurality of sample images prepared beforehand, and on the basis of the degree of similarity-number of similar candidates dispersion, the pedestrian determination threshold values are set so that pedestrians (see hollow white squares in FIG. 9) are separated from non-pedestrian (see solid black rhombuses in FIG. 9). In this embodiment, the threshold value of the degree of similarity (Euclidean distance) is set at 800, and the threshold value of the number of similar candidates is set at 2 or greater (at greater than 1). Due to this manner of setting, no pedestrian is contained in a region in which a pedestrian candidate is determined to be a non-pedestrian (artifact) such as the degree of similarity (Euclidean distance) is less than 800 and the number of similar candidates is greater than 1, that is, an upper left region in FIG. 9; therefore, pedestrians and non-pedestrians (artifacts) are precisely separated and distinguished from each other.

According to the foregoing control fashion, it can be determined whether a pedestrian candidate is a pedestrian or an artifact, merely by determining the degree of similarity between pedestrian candidates. Therefore, even in the case where a plurality of pedestrian candidates are extracted, it is possible to quickly execute the process of determining whether or not a pedestrian candidate is a pedestrian with respect to all the pedestrian candidates.

Furthermore, according to this control fashion, in order to determine that a pedestrian candidate is not a pedestrian, it is necessary that there be at least two similar pedestrian candidates. Therefore, it becomes possible to accurately determine whether or not a pedestrian candidate is a pedestrian.

Furthermore, according to this control fashion, the sizes and the brightnesses of extracted pedestrian candidates are normalized before the degrees of similarity between the pedestrian candidates are found. Therefore, it becomes possible to improve the accuracy of the computation of the degrees of similarity.

In the related-art pedestrian determination methods, determination is performed regarding the characteristics of pedestrian candidates, and therefore it is difficult to distinguish a pedestrian from an object similar to a pedestrian. Hence, the related-art pedestrian determination methods find it difficult to reduce false detections. However, in this embodiment, it can be distinguished whether or not a pedestrian candidate is a pedestrian, without making a determination regarding the characteristics of the pedestrian candidate. Therefore, it becomes possible to reduce false detections of a pedestrian.

While embodiments of the invention have been described above, the invention is not limited to the foregoing embodiments, but may also be modified in various other manners. For example, although in the foregoing embodiments, the invention is applied to the pedestrian detection based on near-infrared images picked by the near-infrared camera, the invention can also be applied to the pedestrian detection based on invisible-light images picked up by an invisible-light camera other than the near-infrared camera, or visible-light images picked up by a visible-light camera.

Although in the foregoing embodiments, the invention is applied to the near-infrared night vision device mounted in a vehicle, the invention is not limited to vehicle-mounted devices, but can also be applied to various other uses.

Furthermore, the pedestrian determination threshold values (the degree of similarity and the number of similar candidates) for distinguishing pedestrians from non-pedestrians (artifacts) are not limited by the foregoing embodiments. For example, the degree of similarity between pedestrian candidates may be determined by comparing the histograms of brightness.

The invention claimed is:

1. A pedestrian detection device comprising:
   pedestrian candidate extraction portion that extracts a pedestrian candidate from a picked-up image; and
   determination portion that finds a degree of similarity between pedestrian candidates if a plurality of pedestrian candidates are extracted by the pedestrian candidate extraction portion, and that determines that a pedestrian candidate whose degree of similarity with another pedestrian candidate is greater than or equal to a predetermined value is not a pedestrian.

2. The pedestrian detection device according to claim 1, wherein
   the determination portion determines that the pedestrian candidate having two or more other pedestrian candidates whose degrees of similarity with said pedestrian candidate are greater than or equal to the predetermined value is not a pedestrian.

3. The pedestrian detection device according to claim 1, wherein
   the pedestrian candidate extraction portion normalizes a size and/or a brightness of the pedestrian candidate extracted, and
   the determination portion finds the degree of similarity between pedestrian candidates normalized in the size and/or brightness by the pedestrian candidate extraction portion.

4. The pedestrian detection device according to claim 3, wherein
   the determination portion finds the degree of similarity between pedestrian candidates by using a Euclidean distance based on the brightness differences in terms of individual pixels between the pedestrian candidates normalized in the size and/or the brightness.

5. The pedestrian detection device according to claim 1, wherein
   the determination portion finds the degree of similarity between pedestrian candidates by using a brightness histogram of pixels of the pedestrian candidates.

6. A pedestrian detection method comprising:
   extracting a pedestrian candidate from a picked-up image; and
   finding a degree of similarity between pedestrian candidates, and determining that a pedestrian candidate whose degree of similarity with another pedestrian candidate is greater than or equal to a predetermined value is not a pedestrian, when a plurality of pedestrian candidates are extracted by extraction of the pedestrian candidate, wherein
   at least one of the steps of extracting and finding is performed using an Electronic Control Device (ECU).

* * * * *